(12) United States Patent
Iljazi

(10) Patent No.: US 10,089,178 B2
(45) Date of Patent: Oct. 2, 2018

(54) DEVELOPING AN ACCURATE DISPERSED STORAGE NETWORK MEMORY PERFORMANCE MODEL THROUGH TRAINING

(71) Applicant: International Business Machines Corporation, Armonk, NY (US)

(72) Inventor: Ilir Iljazi, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/398,540

(22) Filed: Jan. 4, 2017

(65) Prior Publication Data

US 2017/0249551 A1    Aug. 31, 2017

Related U.S. Application Data

(60) Provisional application No. 62/301,214, filed on Feb. 29, 2016.

(51) Int. Cl.
*G06F 11/00* (2006.01)
*G06F 11/10* (2006.01)
(Continued)

(52) U.S. Cl.
CPC .......... *G06F 11/1076* (2013.01); *G06F 3/064* (2013.01); *G06F 3/0604* (2013.01);
(Continued)

(58) Field of Classification Search
None
See application file for complete search history.

(56) References Cited

U.S. PATENT DOCUMENTS 4,092,732 A    5/1978 Ouchi
5,454,101 A    9/1995 Mackay et al.
(Continued)

OTHER PUBLICATIONS

International Searching Authority; International Search Report and Written Opinion; International Application No. PCT/IB2017/051010; dated Jun. 15, 2017; 12 pgs.
(Continued)

*Primary Examiner* — Mujtaba M Chaudry
(74) *Attorney, Agent, or Firm* — Garlick & Markison; Timothy W. Markison; Shayne X. Short

(57) ABSTRACT

A computing device includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations. The computing device receives first samples corresponding to inputs that characterize configuration of the DSN and receives second samples corresponding to outputs that characterize system behavior of the DSN. The computing device then processes the first and samples to generate a DSN model to generate predictive performance of the outputs based on various values of the inputs. In some instances, the DSN model is based on a neural network model that employs the inputs that characterize the configuration of the DSN and generates the outputs that characterize system behavior of the DSN.

15 Claims, 7 Drawing Sheets

(51) Int. Cl.

| | | |
|---|---|---|
| *G06F 3/06* | (2006.01) | |
| *G06F 11/14* | (2006.01) | |
| *G06F 11/30* | (2006.01) | |
| *G06F 11/32* | (2006.01) | |
| *G06F 11/07* | (2006.01) | |
| *G06Q 10/06* | (2012.01) | |
| *G06Q 10/00* | (2012.01) | |
| *H03M 13/15* | (2006.01) | |
| *H03M 13/00* | (2006.01) | |
| *G06F 17/50* | (2006.01) | |
| *G06N 3/04* | (2006.01) | |
| *G06N 3/08* | (2006.01) | |
| *G06N 3/10* | (2006.01) | |
| *G06F 13/40* | (2006.01) | |
| *G06F 13/42* | (2006.01) | |
| *H04L 9/08* | (2006.01) | |
| *H04L 9/32* | (2006.01) | |
| *H04L 29/06* | (2006.01) | |
| *H04L 9/14* | (2006.01) | |

(52) U.S. Cl.
CPC ............ *G06F 3/0605* (2013.01); *G06F 3/067* (2013.01); *G06F 3/0619* (2013.01); *G06F 3/0623* (2013.01); *G06F 3/0629* (2013.01); *G06F 3/0644* (2013.01); *G06F 3/0653* (2013.01); *G06F 3/0659* (2013.01); *G06F 11/0709* (2013.01); *G06F 11/079* (2013.01); *G06F 11/0727* (2013.01); *G06F 11/0751* (2013.01); *G06F 11/0781* (2013.01); *G06F 11/0793* (2013.01); *G06F 11/1451* (2013.01); *G06F 11/3034* (2013.01); *G06F 11/3051* (2013.01); *G06F 11/3055* (2013.01); *G06F 11/327* (2013.01); *G06F 13/4022* (2013.01); *G06F 13/4282* (2013.01); *G06F 17/5009* (2013.01); *G06N 3/04* (2013.01); *G06N 3/084* (2013.01); *G06N 3/10* (2013.01); *G06Q 10/06316* (2013.01); *G06Q 10/063116* (2013.01); *G06Q 10/20* (2013.01); *H03M 13/1515* (2013.01); *H03M 13/616* (2013.01); *H04L 9/0869* (2013.01); *H04L 9/0894* (2013.01); *H04L 9/14* (2013.01); *H04L 9/3242* (2013.01); *H04L 63/061* (2013.01); *H04L 63/101* (2013.01); *G06F 2201/84* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,578,144 | B1 | 10/2003 | Gennaro et al. |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,386,827 | B1* | 6/2008 | Zhu .............. G06F 17/5022 716/103 |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0136384 | A1* | 6/2007 | Hepper ................ G06F 3/0605 |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2013/0290399 | A1* | 10/2013 | Gordon .............. H04L 67/1097 709/201 |
| 2014/0108815 | A9 | 4/2014 | Dhuse et al. |
| 2014/0337622 | A1 | 11/2014 | Resch et al. |
| 2016/0335318 | A1* | 11/2016 | Gerweck ......... G06F 17/30339 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

(56) References Cited

OTHER PUBLICATIONS

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

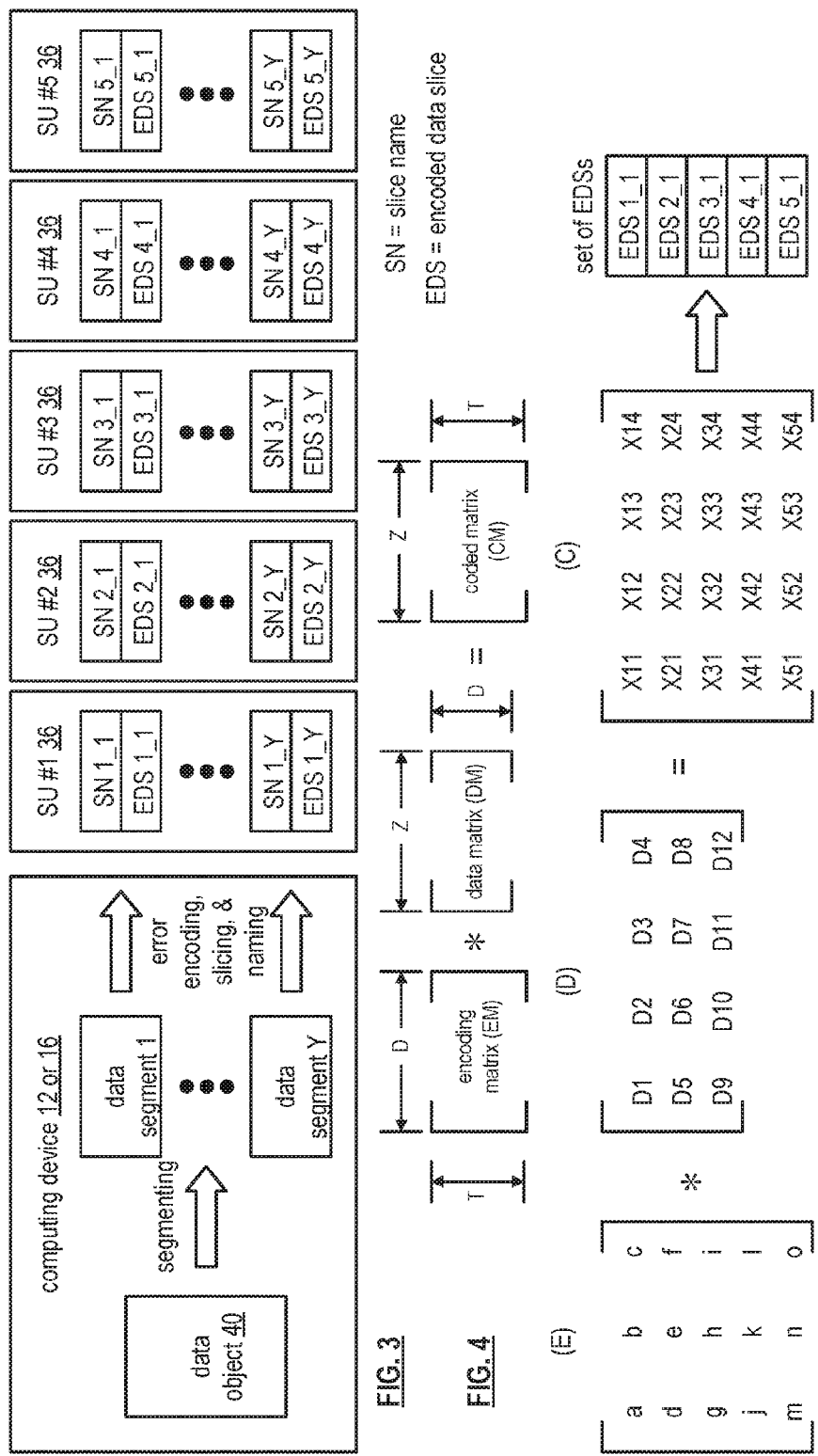

US 10,089,178 B2

DEVELOPING AN ACCURATE DISPERSED STORAGE NETWORK MEMORY PERFORMANCE MODEL THROUGH TRAINING

CROSS REFERENCE TO RELATED PATENTS

The present U.S. Utility Patent Application claims priority pursuant to 35 U.S.C. § 119(e) to U.S. Provisional Application No. 62/301,214, entitled "ENHANCING PERFORMANCE OF A DISPERSED STORAGE NETWORK," filed Feb. 29, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems are provisioned with a particular amount of resources to service the various needs therein. Typically, the amount of resources that are provisioned within such a data storage system initially may service the needs of the data storage system initially, but as needs, conditions, etc. change over time, the provisioned resources will no longer be well-suited to the changed needs of the data storage system. The prior art does not currently provide adequate solutions by which an appropriate amount of resources may be selected and provisioned to ensure an effective pairing of the resources to the needs of such a data storage system.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
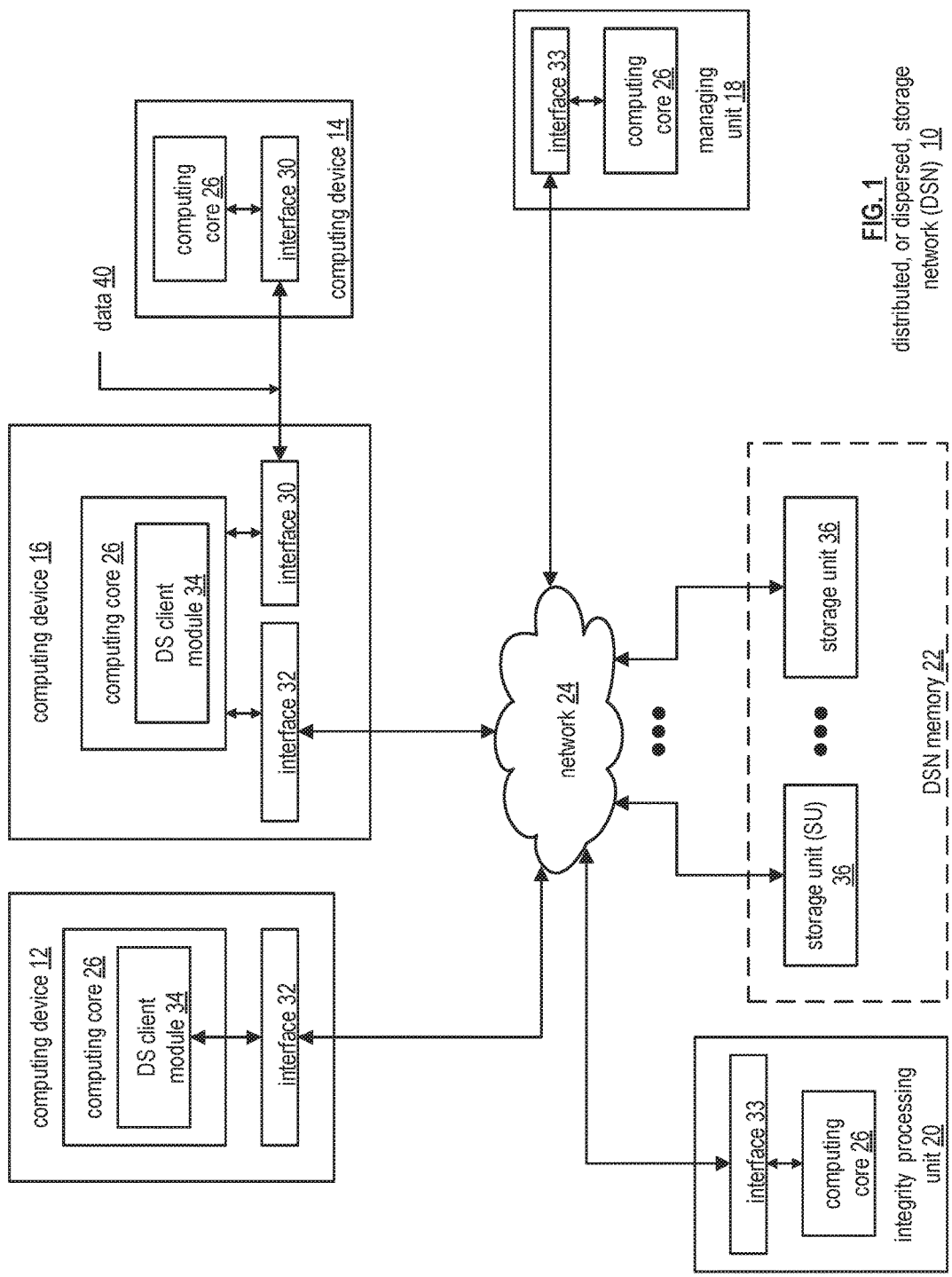
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
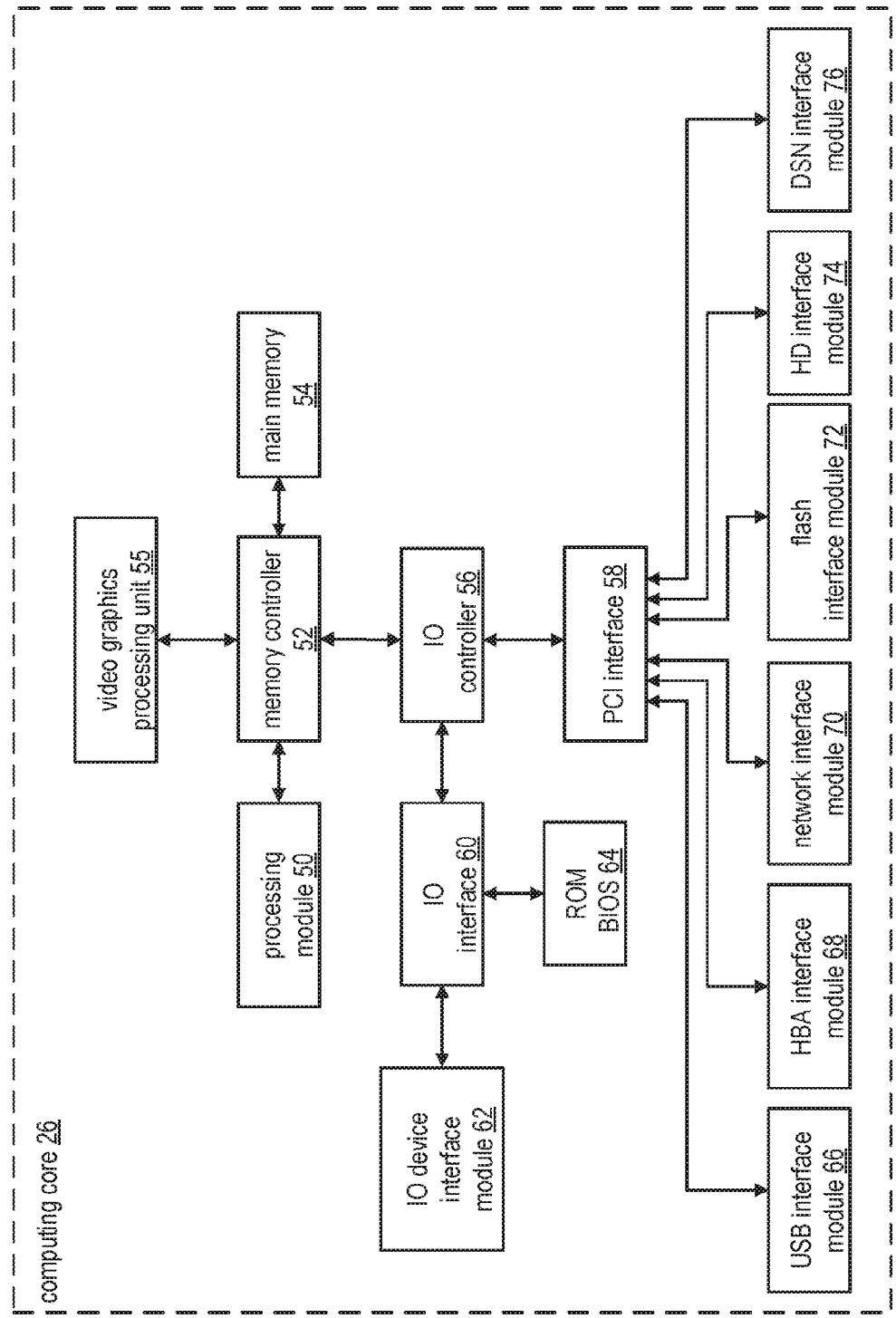
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
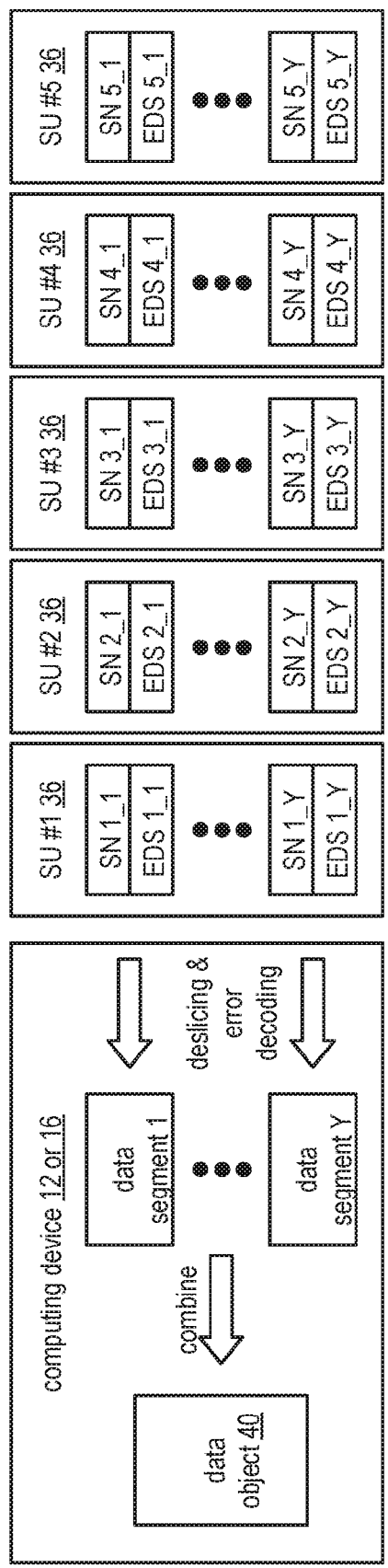
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
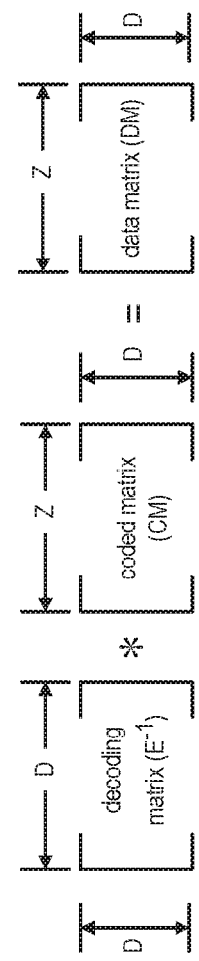
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
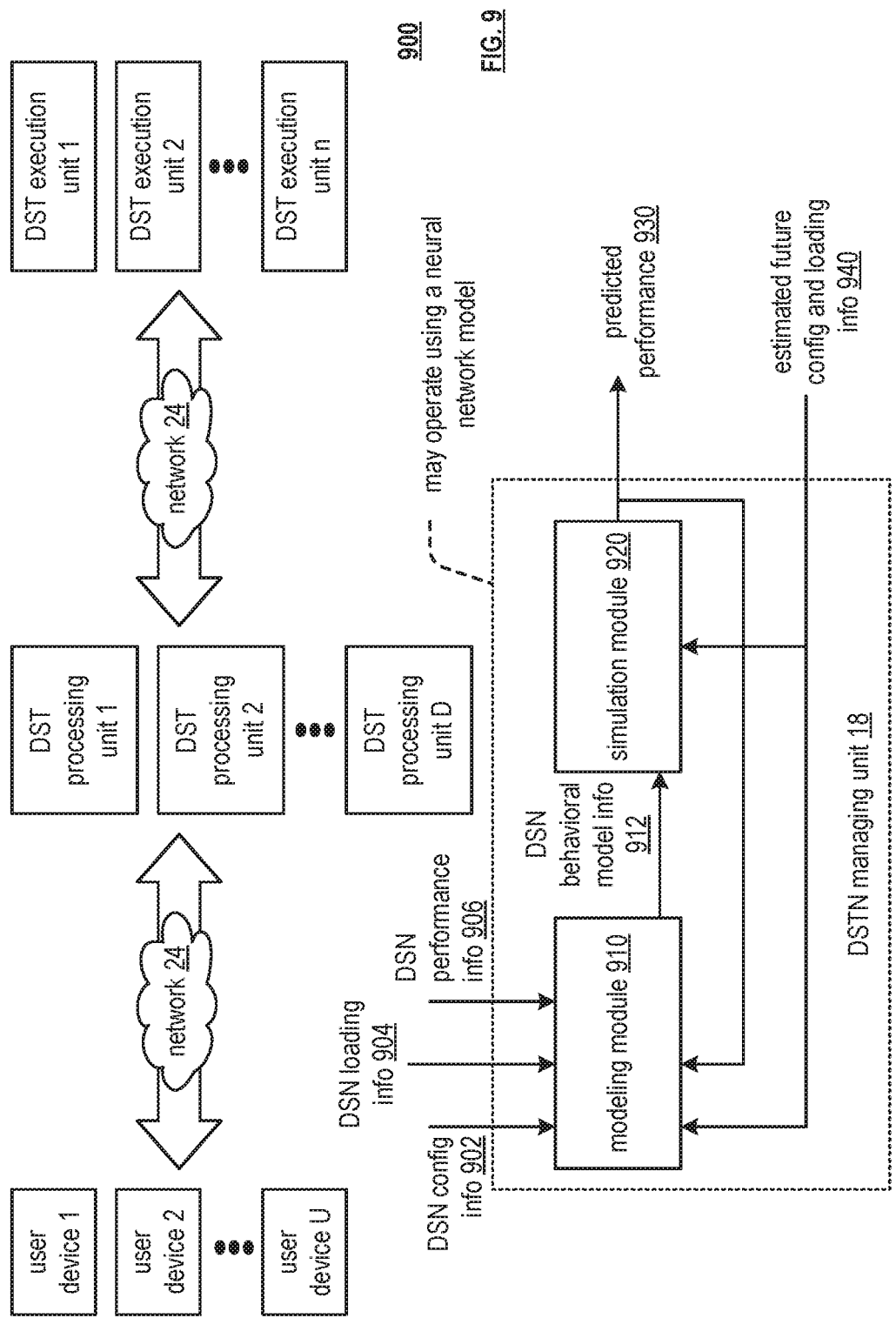
FIG. 9 is a schematic block diagram of another embodiment of a dispersed storage network (DSN) in accordance with the present invention.

FIG. 9 is a schematic block diagram 900 of another embodiment of a dispersed or distributed storage network (DSN) in accordance with the present invention. This includes is a schematic block diagram of another embodiment of a DSN that includes a plurality of user devices 1-U, the network 24 of FIG. 1, a plurality of distributed storage and task (DST) processing units 1-D, a set of DST execution units 1-n, and distribute storage and task network (DSTN) managing unit 18 (e.g., each of which may be separate and particular implementations of various embodiments of the computing devices 12 or 16 of FIG. 1). For example, each user device may be implemented utilizing a first implementation of one or more of the computing devices 12 or 16 of FIG. 1. Each DST processing unit may be implemented utilizing a second implementation of one or more of the computing devices 12 or 16 of FIG. 1. Each DST execution unit may be implemented utilizing a third implementation of one or more of the computing devices 12 or 16 of FIG. 1. Hereafter, in some examples, note that each DST execution unit may be interchangeably referred to as a storage unit (SU) (e.g., SU 36 such as with respect to FIG. 3, FIG. 7, etc.) and the set of DST execution units may be interchangeably referred to as a set of SUs (e.g., again, such as again shown with respect to the sets of SUs such as with respect to FIG. 3, FIG. 7, etc.). The DSTN managing unit 18 includes a modeling module 910 and a simulation module 920. Each of the modeling module 910 and the simulation module 920 be implemented utilizing the processing module 50 such as with respect to FIG. 2. The DSN functions to model operations within the DSN.

An example of operation of the modeling of the DSN, the modeling module 910 obtains DSN information that includes one or more of a DSN configuration information 902, DSN loading information 904, and a DSN performance information 906. The DSN configuration information includes information dispersal algorithm (IDA) configuration, IDA codec information, and security algorithm information. The DSN loading information includes one or more of a number of user devices, a number of requests per user per unit of time, a number of objects stored, a number of available storage units, available processing power, and a concurrency of operation level. The DSN performance information includes one or more of the operations per second, throughput levels, and latency levels. The obtaining includes one or more of interpreting a query response and receiving the DSN information.

Having obtained the DSN information, the modeling module 910 generates first approximation DSN behavior model information based on the DSN information. The generating includes inputting configuration information and loading information (e.g., by a manager) into a baseline DSN model based on the performance information. Having generated the first approximation DSN behavioral model information, the modeling module 910 modifies the first approximation DSN behavioral model information based on a comparison of predicted performance 930 to the DSN performance information for a given estimated future configuration in loading information the compares favorably to the DSN configuration information in loading information to produce DSN behavioral model information. For example, the modeling module 910 generates error information based on a difference between the predicted performance 930 and the DSN performance info for a given estimated future configuration in loading information associated with the current DSN configuration information in loading information and modifies one or more parameters of the first approximation DSN behavioral model to recursively minimize the error information.

The simulation module 920 generates predictive performance based on the DSN behavior model information and the estimated future configuration in loading information. For example, the simulation module 920 stimulates the DSN behavior model with the estimated future configuration and loading information to produce the predicted performance 930. The DSTN managing unit 18 may recursively repeat the above steps to produce a difference between the DSN performance information on the predicted performance 930 information that is less than an error threshold level.

Note that some examples of modeling as described herein may be performed as to generate predictive performance of outputs of a DSN based on various values of the inputs that characterize the configuration of the DSN. Also note that examples of modeling as described herein may be performed using a neural network model including features such as described with respect to FIG. 10.

In an example of operation and implementation, a computing device 12 or 16 includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

For example, a computing device 12 or 16 is configured to receive first samples corresponding to inputs that characterize configuration of the DSN and also to receive second samples corresponding to outputs that characterize system behavior of the DSN. The computing devices 12 or 16 is then configured to process the first samples and the second samples to generate a DSN model to generate predictive performance of the outputs based on various values of the inputs that characterize the configuration of the DSN.

In some examples, the computing device 12 or 16 is configured to generate the DSN model based on a neural network model that includes the inputs that characterize the configuration of the DSN as inputs of the neural network model and the outputs that characterize system behavior of the DSN as outputs of the neural network model, and hidden neurons of at least one layer that receive the inputs of the neural network model and generate the outputs of the neural network model. Note that connections from the hidden neurons to other hidden neurons or the outputs of the neural network model are weighted based on weights. The computing device 12 or 16 is configured to initialize the weights to predetermined values and to adjust the weights from the predetermined values based on backpropagation of error values of the neural network model backwards through the neural network model starting at the outputs of the neural network model so that each hidden neuron of the hidden neurons includes a corresponding error value that substantially represents its respective contribution to outputs of the neural network model. Note that the error values of the neural network model correspond to differences between the outputs of the neural network model and expected outputs of the neural network model.

In even other examples, the computing device 12 or 16 is configured to receive third samples corresponding to the inputs that characterize the configuration of the DSN after receiving the first samples corresponding to the inputs that characterize configuration of the DSN. The computing device 12 or 16 is then configured to receive a fourth samples corresponding to the outputs that characterize system behavior of the DSN after receiving the second samples corresponding to the outputs that characterize system behavior of the DSN. The computing device 12 or 16 is then configured to process the third samples and the fourth samples to update the DSN model to update the predictive performance of the outputs based on various values of the inputs that characterize the configuration of the DSN.

In some examples, the processing module of the computing device 12 or 16, when operable within the computing device based on the operational instructions, further includes a modeling module that is configured to generate DSN behavioral model information based on the plurality of inputs that characterize configuration of the DSN and a simulation module that is configured to generate the predictive performance of the plurality of outputs. Note that the simulation module is configured to feedback the predictive performance of the plurality of outputs to the modeling module for use by the modeling module to generate subsequent DSN behavioral model information based on the plurality of inputs that characterize configuration of the DSN and the predictive performance of the plurality of outputs.

Examples of inputs that characterize the configuration of the DSN include any one or more of the following considerations. For example, they may include a distribution of a data object within the DSN. Note that the data object is segmented into a data segments, and a data segment of the data segments is dispersed error encoded in accordance with dispersed error encoding parameters to produce a set of encoded data slices (EDSs) that is of pillar width. Note that the set of EDSs are distributedly stored among a plurality of storage units (SUs) of the DSN. Also, a decode threshold number of EDSs are needed to recover the data segment, and a read threshold number of EDSs provides for reconstruction of the data segment. Note also that a write threshold number of EDSs provides for a successful transfer of the set of EDSs from a first at least one location in the DSN to a second at least one location in the DSN.

Other examples of the inputs that characterize the configuration of the DSN include any one or more of the following as well: a concurrency level of storage of the data object within the DSN including storage of copies of at least the read threshold number of EDSs corresponding to the data object within the DSN, a number of dispersed storage (DS) units and types of DS units within the DSN, a number of network communication links and latencies of network communication links within the DSN, a configuration of an information dispersal algorithm (IDA) including the dispersed error encoding parameters employed within the DSN, one or more codecs employed within the DSN, and/or one or more network security protocols employed within the DSN, and/or any other considerations, elements, etc.

Examples of outputs that characterize system behavior of the DSN include any one or more of the following considerations. For example, they may include a first number of sustained operations including data access requests per second per dispersed storage (DS) unit within the DSN, a second number of sustained operations including data access requests per second per storage unit (SU) within the DSN, a first throughput level per DS unit within the DSN, a second throughput level per SU within the DSN, a first latency from at least one SU to at least one DS processing unit within the DSN, and/or a second latency from at least one computing device providing at least one data access request to the at least one DS processing unit within the DSN, and/or any other considerations, elements, etc.

Note that the computing device may be located at a first premises that is remotely located from at least one SU of a plurality of SUs within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

Figure 10:
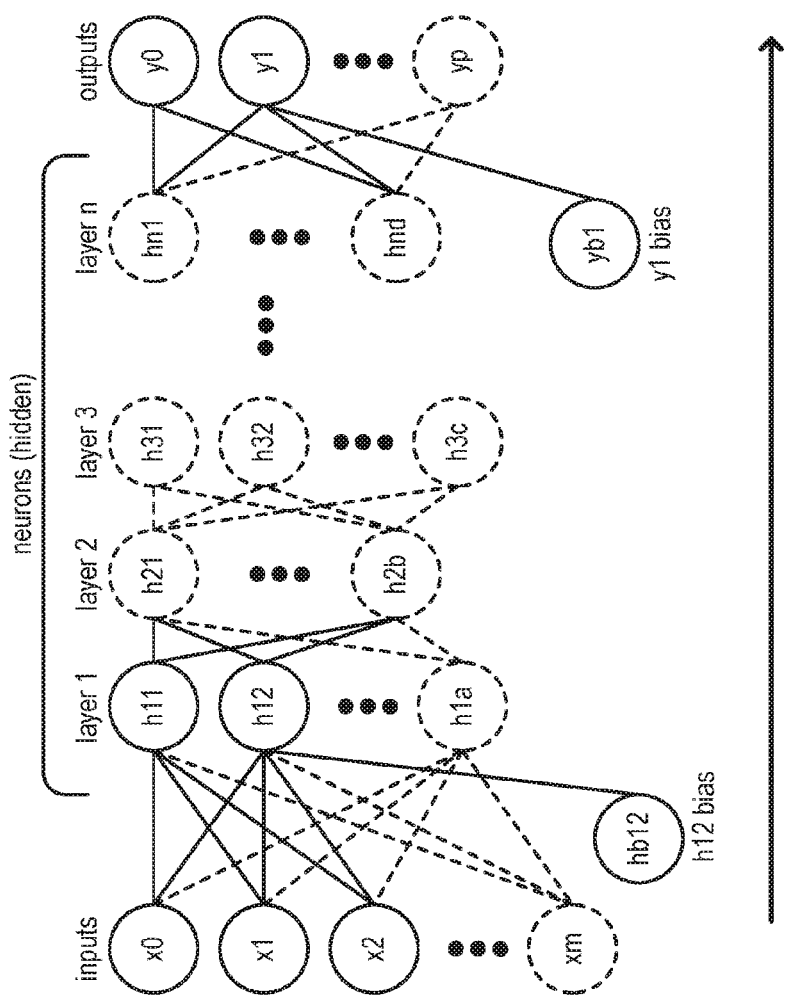
FIG. 10 is a schematic block diagram of an example of neural network model in accordance with the present invention.

FIG. 10 is a schematic block diagram 1000 of an example of neural network model in accordance with the present invention. In general, a neural network model include a number of inputs (e.g., x0, x1, x2, and if desired up to xm), a number of neurons (e.g., hidden nodes, such as represented by multiple layers such as neurons h11, h12, and if desired up to h1a in layer 1 and then optionally to include neurons h21, and if desired up to h2b in layer 2, and neurons h11, h12, and if desired up to h1a in layer 1 and so on and then optionally to include neurons h21, h32, and if desired up to h3c in layer 3 and so on and optionally to include neurons h21, and if desired up to hnd in layer n, such that m, a, b, c, n, d, are all positive integers), and number of inputs (e.g., y0, y1, and if desired up to yp such that p is a positive integer). Note also that neural network model may also include one or more biases (e.g., an h12 bias hb12 that biases the neuron h12, a y1 bias yb1 that biases the output y1, as some possible examples).

In general, a neural network model considers inputs that connect via connections between the inputs and neurons (e.g., hidden nodes) that may also interconnect with other neurons (and layers) that connect via other connections to outputs. The inputs are known and the outputs are observed/known. The respective connections between the inputs, neurons, and outputs, etc. have respective weights that scale the output from a given node that is provided to another node. As an example, a corresponding weight scales the output from neuron h11 in layer 1 that is provided to neuron h2b in layer 2 and corresponds to the connection between neuron h11 in layer 1 to the neuron h2b in layer 2. Analogously, another corresponding weight scales the output from input x2 that is provided to neuron h12 in layer 1 and corresponds to the connection between input x2 to the neuron h12 in layer 1. As the neural network model initiates, the respective weights corresponding to the may be initialized the weights to predetermined values and then updated as the neural network model observes the outputs and adapts the weights so as better to model the actual performance of the model.

With respect to applying such a neural network model to model operation of a DSN, in one example, such a computing device is configured to generate a DSN model based on a neural network model that includes the inputs that characterize the configuration of the DSN as inputs of the neural network model and the outputs that characterize system behavior of the DSN as outputs of the neural network model, and a hidden neurons of at least one layer that receive the inputs of the neural network model and generate the outputs of the neural network model.

In general, the weights are initialized to some values (e.g., all equal to begin in one specific embodiment). Then, the inputs are provided to the neural network model, and the outputs are measured/observed, and over time and over different respective sets of samples of both the inputs are provided and outputs are measured/observed, and adjustment of the respective the different respective weights that scale the outputs provide from node to node among the connections between the inputs, hidden neurons, and outputs over time until the neural network model acceptably models or emulates the actual DSN behavior (e.g., substantially, approximately, etc. within some acceptable degree such as based on any desired industry-accepted tolerance for its corresponding term and/or relativity between items, such an industry-accepted tolerance ranges from less than one percent to fifty percent, etc.). The determination of the weights within the neural network model may be made based on backpropagation.

With respect to performing backpropagation, one approach is to use a partial derivative (e.g., ∂C/∂w) of a cost function, C, with respect to any weight with (or bias) in the neural network model. The expression of the partial derivative (e.g., ∂C/∂w) of the cost function, C, provides a means to determine how much the output or cost, C, changes as the weights and/or biases are changed. Being a partial derivative, the term in directed to or limited to the particular influence of the respective weight associated therewith while (ideally) removing the effects of other influences in the neural network model. In general, back propagation is a process in which the error values (e.g., different between the actual outputs that are measured/observed and those produced by the neural network model) are fed back into the system backwards starting from the outputs and backwards to any prior layers and eventually to the inputs of the neural network model. As the neural network model is being trained/is learning, each respective neuron includes an associated error value that substantially represents its respective contribution to the original output. Also, a loss function may be viewed as an output of the neural network model as compared to a desired output or in the case of modeling actual behaviors, with measured/observed output. In general, the backpropagation process uses the respective error values associated with the respective neurons in the neural network model to calculate the gradient or partial derivative (e.g., ∂C/∂w) of the cost function, C, with respect to the weights in the neural network model. Over time, as more and more samples of the inputs are provided and more and more samples of the outputs are measured/observed, as the respective values of the weights within the neural network model are updated, adjusted, refined, etc., the neural network model eventually converges on a model that substantially, approximately, etc. models or emulates the actual performance of the DSN that such a specific example of a neural network model is implemented to model.

Also, note that the hidden neurons in the intervening one or more layers between the inputs and outputs organize themselves in a manner that the different respective neurons adapt and change as a function of the other neurons based on all of the inputs.

In general, note that the neural network model is trained and can be adjusted and re-trained over time with more and more samples of inputs and measured/observed output. In addition, note that as more and more information is provided, the neural network model can be continually updated, revised, improved, etc. so that it more accurately and effectively models the actual DSN that the neural network model is intended to model.

Once the neural network model is trained, then the neural network model, when modeling a DSN, may be used to generate predictive performance of the outputs of the neural network model (e.g., that correspond to outputs of the DSN) based on various values of the inputs of the neural network model (e.g., that correspond to inputs of the DSN) that characterize the configuration of the DSN. In some examples, this predictive performance is then used to design and implement another DSN based on the learning that has been achieved based on the neural network model that models the DSN.

This disclosure presents, among other things, a means by which predictive performance of one or more outputs of a DSN may be determined based on various values of one or more inputs that characterize the configuration of the DSN. For example, some systems such as a DSN can be so complex, and have such a large number of variables, that attempting to design a realistic model by merely guessing can become an infeasible task. For example, a DSN that includes various computing devices (e.g., accessors, execution units, storage units (SUs), etc. and/or other types of computing devices) can be such highly complex systems with so many highly complex components, and even more complex possible interactions being possible among these many diverse and complex components that to create such an accurate model that allows for future design of an improved DSN can be impossible.

This disclosure presents, among other things, a novel approach to train a neural network model such as by using a technique of "back propagation". In such a scheme, various input variables are provided to the neural network model and can include one or more of the following: object/file distribution, concurrency level, number and types of downstream (DS) processing units, number and types of network links and their latencies, number and types of DS units, and numbers and types of memory devices and capacities for each DS unit, IDA configuration, codecs in use within the DSN, network security algorithms in use within the DSN, etc. and/or any other considerations, inputs, etc.

Outputs, or measurements from observation of the system behavior, which the neural network model may attempt to predict include one or more of the following: number of sustained operations per second per DS processing unit, number of sustained operations per second per DS unit, throughput level per DS processing unit, throughput level per DS unit, latency from DS processing unit to DS unit, latency from requester to DS processing unit, etc. and/or any other considerations, inputs, etc.

Many samples of these input variables, and observed output measurements will be taken, from various system configurations and various workloads, with the aim at building different models to predict at least one of the above measured outputs. Initially, the neural network model will produce more or less randomly guessed results, but with each sample available, the network can be repeatedly trained via back propagation, eventually leading to more accurate prediction capabilities. When the model is well trained, it can then provide estimates for system performance for as of yet, unobserved (or even theoretically deployed) system configurations. This can help greatly in the design and provisioning of DSN memories to meet certain performance goals.

Figure 11A:
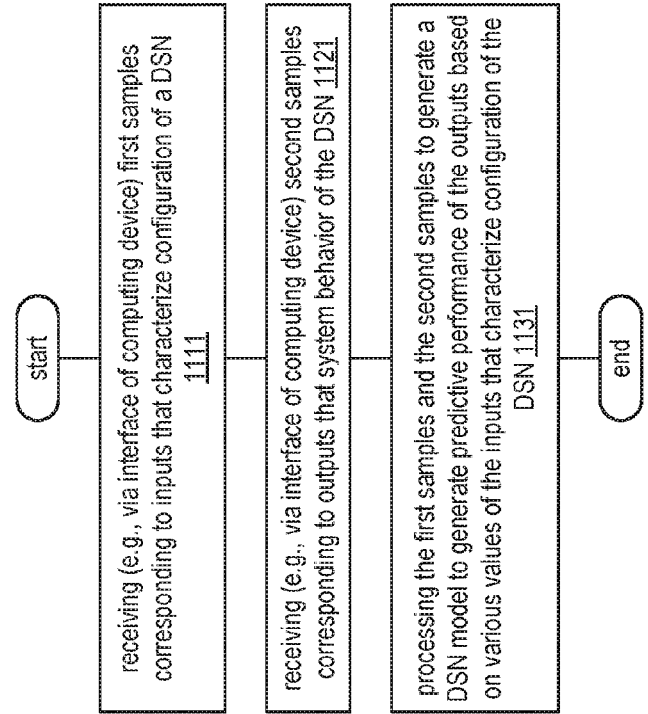
FIG. 11A is a diagram illustrating an embodiment of a method for execution by one or more computing devices in accordance with the present invention.

FIG. 11A is a diagram illustrating an embodiment of a method 1101 for execution by one or more computing devices in accordance with the present invention. This includes a flowchart illustrating an example of modeling a dispersed storage network (DSN). The method 1101 includes a step 1110 where a processing module (e.g., of a distributed storage and task network (DSTN) managing unit) obtains DSN information that includes one or more of configuration information, loading information, and performance information. The obtaining includes at least one of interpreting a query response and receiving the DSN information.

The method 1101 continues at the step 1120 where the processing module generates first approximation DSN behavioral model information based on the DSN information. For example, the processing module inputs configuration in loading information into a baseline DSN model based on the performance information.

The method 1101 continues at the step 1130 where the processing module modifies the first approximation DSN behavioral model information based on a comparison of predicted performance to the DSN performance information for a given estimated future configuration and loading information 940 to produce DSN behavioral model information. For example, the processing module generates error information as the difference between the predicted performance and the DSN performance information for a given estimated future configuration and loading information 940 associated with the current DSN configuration information in loading information and modifies one or more parameters of the first approximation DSN behavioral model to recursively minimize the error information.

The method 1101 continues at the step 1140 where the processing module generates predictive performance based on the DSN behavioral model information and the estimated future configuration and loading information 940. For example, the processing module stimulates the DSN behavioral model with the given estimated future configuration and loading information 940 to produce the predicted performance. The processing module make recursively repeat the above steps to produce a difference between the DSN performance information and the predicted performance that is less than an error threshold level.

Figure 11B:
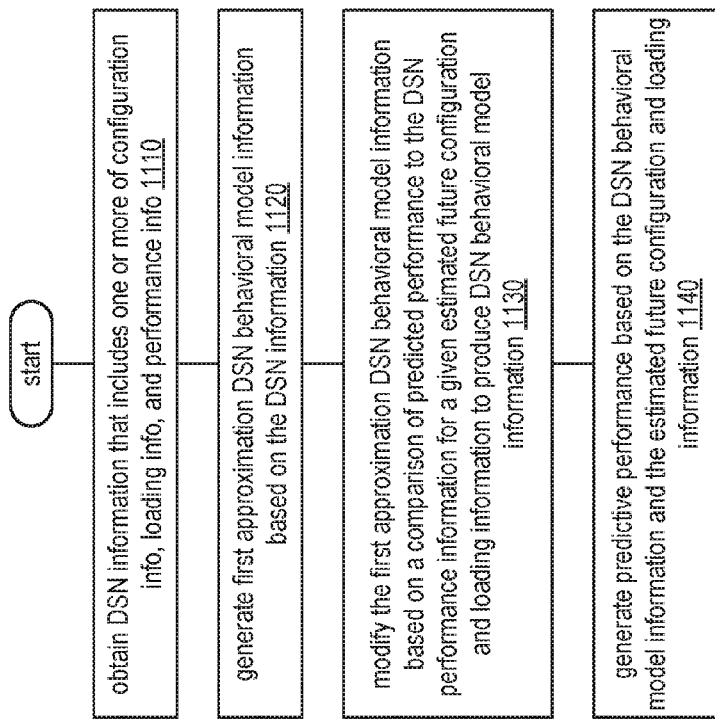
FIG. 11B is a diagram illustrating another embodiment of a method for execution by one or more computing devices in accordance with the present invention.

FIG. 11B is a diagram illustrating another embodiment of a method 1102 for execution by one or more computing devices in accordance with the present invention. The method 1101 begins in step 1111 by receiving, via an interface of the computing device that is configured to interface and communicate with a dispersed or distributed storage network (DSN), a first plurality of samples corresponding to a plurality of inputs that characterize configuration of the DSN. The method 1101 continues in step 1121 by receiving, via the interface of the computing device, a second plurality of samples corresponding to a plurality of outputs that characterize system behavior of the DSN. The method 1101 then operates in step 1131 by processing the first plurality of samples and the second plurality of samples to generate a DSN model to generate predictive performance of the plurality of outputs based on various values of the plurality of inputs that characterize the configuration of the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
    an interface configured to interface and communicate with a dispersed or distributed storage network (DSN);
    memory that stores operational instructions; and
    a processing module operably coupled to the interface and to the memory, wherein the processing module, when operable within the computing device based on the operational instructions, is configured to:
        receive a first plurality of samples corresponding to a plurality of inputs that characterize configuration of the DSN;
        receive a second plurality of samples corresponding to a plurality of outputs that characterize system behavior of the DSN; and
        process the first plurality of samples and the second plurality of samples to generate a DSN model to generate predictive performance of the plurality of outputs based on various values of the plurality of inputs that characterize the configuration of the DSN.

2. The computing device of claim 1, wherein the processing module, when operable within the computing device based on the operational instructions, is further configured to:
    generate the DSN model based on a neural network model that includes the plurality of inputs that characterize the configuration of the DSN as inputs of the neural network model and the plurality of outputs that characterize system behavior of the DSN as outputs of the neural network model, and a plurality of hidden neurons of at least one layer that receive the inputs of the neural network model and generate the outputs of the neural network model, wherein connections from the plurality of hidden neurons to other hidden neurons or the outputs of the neural network model are weighted based on a plurality of weights;
    initialize the plurality of weights to a predetermined plurality of values; and
    adjust the plurality of weights from the predetermined plurality of values based on backpropagation of error values of the neural network model backwards through the neural network model starting at the outputs of the neural network model so that each hidden neuron of the plurality of hidden neurons includes a corresponding error value that substantially represents its respective contribution to outputs of the neural network model, wherein the error values of the neural network model correspond to differences between the outputs of the neural network model and expected outputs of the neural network model.

3. The computing device of claim 1, wherein the processing module, when operable within the computing device based on the operational instructions, is further configured to:
receive a third plurality of samples corresponding to the plurality of inputs that characterize the configuration of the DSN after receiving the first plurality of samples corresponding to the plurality of inputs that characterize configuration of the DSN;
receive a fourth plurality of samples corresponding to the plurality of outputs that characterize system behavior of the DSN after receiving the second plurality of samples corresponding to the plurality of outputs that characterize system behavior of the DSN; and
process the third plurality of samples and the fourth plurality of samples to update the DSN model to update the predictive performance of the plurality of outputs based on various values of the plurality of inputs that characterize the configuration of the DSN.

4. The computing device of claim 1, wherein the processing module, when operable within the computing device based on the operational instructions, further comprises:
a modeling module configured to generate DSN behavioral model information based on the plurality of inputs that characterize configuration of the DSN; and
a simulation module configured to generate the predictive performance of the plurality of outputs, wherein the simulation module is configured to feedback the predictive performance of the plurality of outputs to the modeling module for use by the modeling module to generate subsequent DSN behavioral model information based on the plurality of inputs that characterize configuration of the DSN and the predictive performance of the plurality of outputs.

5. The computing device of claim 1, wherein the plurality of inputs that characterize the configuration of the DSN include at least one of:
a distribution of a data object within the DSN, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among a plurality of storage units (SUs) of the DSN, wherein a decode threshold number of EDSs are needed to recover the data segment, wherein a read threshold number of EDSs provides for reconstruction of the data segment, and wherein a write threshold number of EDSs provides for a successful transfer of the set of EDSs from a first at least one location in the DSN to a second at least one location in the DSN;
a concurrency level of storage of the data object within the DSN including storage of copies of at least the read threshold number of EDSs corresponding to the data object within the DSN;
a number of dispersed storage (DS) units and types of DS units within the DSN;
a number of network communication links and latencies of network communication links within the DSN;
a configuration of an information dispersal algorithm (IDA) including the dispersed error encoding parameters employed within the DSN;
one or more codecs employed within the DSN; or
one or more network security protocols employed within the DSN.

6. The computing device of claim 1, wherein the plurality of outputs that characterize system behavior of the DSN include at least one of:
a first number of sustained operations including data access requests per second per dispersed storage (DS) unit within the DSN;
a second number of sustained operations including data access requests per second per storage unit (SU) within the DSN;
a first throughput level per DS unit within the DSN;
a second throughput level per SU within the DSN;
a first latency from at least one SU to at least one DS processing unit within the DSN; or
a second latency from at least one computing device providing at least one data access request to the at least one DS processing unit within the DSN.

7. The computing device of claim 1 further comprising:
a storage unit (SU) of a plurality of storage units (SUs) within the DSN, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A method for execution by a computing device, the method comprising:
receiving, via an interface of the computing device that is configured to interface and communicate with a dispersed or distributed storage network (DSN), a first plurality of samples corresponding to a plurality of inputs that characterize configuration of the DSN;
receiving, via the interface of the computing device, a second plurality of samples corresponding to a plurality of outputs that characterize system behavior of the DSN; and
processing the first plurality of samples and the second plurality of samples to generate a DSN model to generate predictive performance of the plurality of outputs based on various values of the plurality of inputs that characterize the configuration of the DSN.

10. The method of claim 9 further comprising:
generating the DSN model based on a neural network model that includes the plurality of inputs that characterize configuration of the DSN as inputs of the neural network model and the plurality of outputs that characterize system behavior of the DSN as outputs of the neural network model, and a plurality of hidden neurons of at least one layer that receive the inputs of the neural network model and generate the outputs of the neural network model, wherein connections from the plurality of hidden neurons to other hidden neurons or the outputs of the neural network model are weighted based on a plurality of weights;
initializing the plurality of weights to a predetermined plurality of values; and
adjusting the plurality of weights from the predetermined plurality of values based on backpropagation of error values of the neural network model backwards through the neural network model starting at the outputs of the neural network model so that each hidden neuron of the plurality of hidden neurons includes a corresponding error value that substantially represents its respective contribution to outputs of the neural network model, wherein the error values of the neural network model correspond to differences between the outputs of the neural network model and expected outputs of the neural network model.

11. The method of claim 9 further comprising:
receiving, via the interface of the computing device, a third plurality of samples corresponding to the plurality of inputs that characterize configuration of the DSN after receiving the first plurality of samples corresponding to the plurality of inputs that characterize the configuration of the DSN;
receiving, via the interface of the computing device, a fourth plurality of samples corresponding to the plurality of outputs that characterize system behavior of the DSN after receiving the second plurality of samples corresponding to the plurality of outputs that characterize system behavior of the DSN; and
processing the third plurality of samples and the fourth plurality of samples to update the DSN model to update the predictive performance of the plurality of outputs based on various values of the plurality of inputs that characterize the configuration of the DSN.

12. The method of claim 9 further comprising:
operating a modeling module of the computing device to generate DSN behavioral model information based on the plurality of inputs that characterize the configuration of the DSN; and
operating a simulation module of the computing device to generate the predictive performance of the plurality of outputs, wherein the simulation module is configured to feedback the predictive performance of the plurality of outputs to the modeling module for use by the modeling module to generate subsequent DSN behavioral model information based on the plurality of inputs that characterize the configuration of the DSN and the predictive performance of the plurality of outputs.

13. The method of claim 9, wherein the plurality of inputs that characterize the configuration of the DSN include at least one of:
a distribution of a data object within the DSN, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among a plurality of storage units (SUs) of the DSN, wherein a decode threshold number of EDSs are needed to recover the data segment, wherein a read threshold number of EDSs provides for reconstruction of the data segment, and wherein a write threshold number of EDSs provides for a successful transfer of the set of EDSs from a first at least one location in the DSN to a second at least one location in the DSN;
a concurrency level of storage of the data object within the DSN including storage of copies of at least the read threshold number of EDSs corresponding to the data object within the DSN;
a number of dispersed storage (DS) units and types of DS units within the DSN;
a number of network communication links and latencies of network communication links within the DSN;
a configuration of an information dispersal algorithm (IDA) including the dispersed error encoding parameters employed within the DSN;
one or more codecs employed within the DSN; or
one or more network security protocols employed within the DSN.

14. The method of claim 9, wherein the plurality of outputs that characterize system behavior of the DSN include at least one of:
a first number of sustained operations including data access requests per second per dispersed storage (DS) unit within the DSN;
a second number of sustained operations including data access requests per second per storage unit (SU) within the DSN;
a first throughput level per DS unit within the DSN;
a second throughput level per SU within the DSN;
a first latency from at least one SU to at least one DS processing unit within the DSN; or
a second latency from at least one computing device providing at least one data access request to the at least one DS processing unit within the DSN.

15. The method of claim 9, wherein:
the computing device is a SU of the plurality of SUs within the DSN, a wireless smart phone, a laptop, a tablet, a personal computers (PC), a work station, or a video game device; and
the DSN includes at least one of a wireless communication system, a wire lined communication system, a non-public intranet system, a public internet system, a local area network (LAN), or a wide area network (WAN).

* * * * *